Dec. 7, 1965 R. W. HENDERSON ETAL 3,222,182
DRYING INSTANT TEA
Filed May 16, 1963 2 Sheets-Sheet 1

INVENTORS
RICHARD W. HENDERSON &
EDWARD SELTZER
BY
Brumbaugh, Free, Graves and Donohue
their ATTORNEYS

3,222,182
DRYING INSTANT TEA
Richard W. Henderson, Colonia, and Edward Seltzer, West Englewood, N.J., assignors to Thomas J. Lipton, Inc., Hoboken, N.J., a corporation of Delaware
Filed May 16, 1963, Ser. No. 280,991
8 Claims. (Cl. 99—77)

The present invention relates to an improved method of drying tea concentrates for the production of instant tea.

In the preparation of dried, soluble tea, that is, the so-called "instant" tea, the raw tea leaves are extracted, and a concentrated tea extract is prepared. The concentrate, which may contain from 2% to 70% by weight solids, is subsequently subjected to an evaporation process to remove the water, and produce the desired dried, soluble tea powder.

A common method of evaporating the water is by spray drying. The spray drying process, however, does not normally yield a low bulk density product without compromising quality. The incorporation of a non-condensible gas to expand the droplets before they dry also tends to remove volatile flavor components, while agglomeration subsequent to drying, another method of reducing density, adversely affects both quality and yield, as well as being expensive in equipment and labor. Nevertheless, the spray drying process has been commercially very popular because of the high capacity and low bulk density which may be obtained.

A second method which may be used is a vacuum drying technique in which water is removed at very much lower temperatures under vacuum conditions. In this method a layer of concentrated extract is cast onto a moving surface, such as a single rotating drum or a moving belt, subjected to drying conditions, and thereafter scraped from the surface by means of a doctor blade. To form the layer of concentrate, a well or pan is provided below the moving surface carrying a supply of an extract to be dried. Interposed between the well and the primary moving surface is a secondary roller which is partially immersed in the extract in the well. As the secondary roller rotates, a film of tea extract is formed on its surface, which film is cast onto the primary moving surface and carried into the drying zone.

The vacuum drying processes, however, have not been without difficulties. An important disadvantage in the vacuum drying process of the above described type is the formation of an insoluble sediment in the well, that is the pan from which the tea concentrate is taken to apply it to the heated surface for drying. This is thought to be due to the components of low solubility present in the tea concentrate.

A second important disadvantage of the vacuum drying process, as described above, is that the density of the product is undesirably high. In general, the soluble tea product should have a bulk density in the range of about 0.06 to about 0.17 gram per cc. Bulk densities in excess of about 0.17 gm./cc. have been found to be generally unacceptable to the consumer, while at bulk densities below about 0.06 gram per cc. the product becomes too fragile and tends to break up during normal handling and packaging procedures. Because of the tendency of some vacuum drying methods to produce a relatively dense product, they have not met with wide commercial acceptance.

It is an object of the present invention to provide an improved method for producing soluble tea powders.

Another object is to obtain such a process particularly adapted to drying unfilled and undecreamed tea concentrates.

It is a further object of this invention to provide a process for preparing soluble tea powders having a bulk density between about 0.06 and 0.17 gram per cc.

These and other objects of this invention are realized by supplying the tea concentrate to the nip formed by a pair of horizontally adjacent rolls, rotating the surfaces of the rolls to form a film of tea extract on the surfaces of each roll and heating the rolls under a vacuum. The dried tea product is scraped from the surfaces of the two rolls, collected, and removed from the vacuum chamber.

For a better understanding of the present invention, reference may be had to the following figures in which.

Figure 1:
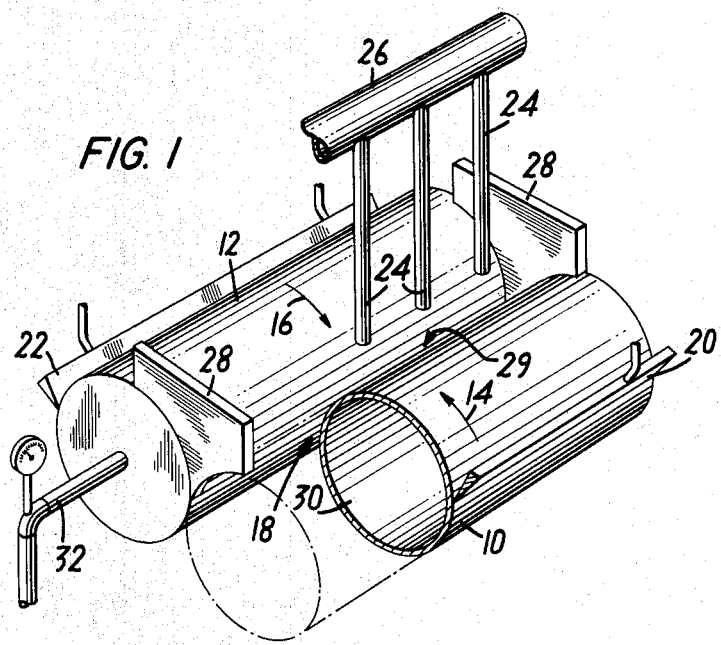
FIGURE 1 is a sketch of a double drum vacuum roller adapted to carry out the present invention.
Figure 2:
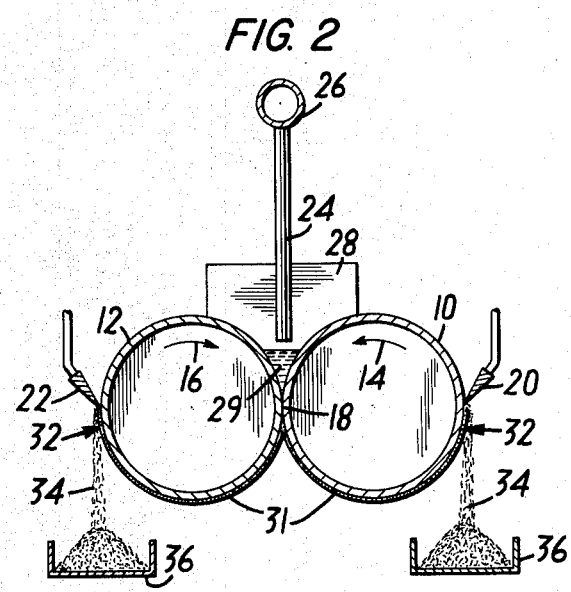
FIGURE 2 is an end view of a double roll dryer illustrating the practice of the process of the present invention.

Referring to FIGURES 1 and 2, the drying of a tea concentrate is carried out in an apparatus comprising a pair of counter-rotating rolls 10 and 12, roll 10 rotating in a counterclockwise direction as indicated by arrow 14 and roll 12 rotating in a clockwise direction as indicated by arrow 16. Rolls 12 and 10 are spaced horizontally apart from each other and meet at a nip 18. The rolls are mounted on and rotate on axial bearings not shown in the drawings.

Approximately diametrically opposed to the nip 18 on each roll are doctor blades 20 and 22, which scrape the dried tea solids from the surface of the roll. One or more down-comers 24 are provided from a distribution header 26 which supply the tea extract to be dried to the well 29 formed above the nip of the rolls. At either end of the roll assembly a plate 28 is provided in sliding contact with both rolls, and in substantially liquid-tight relation therewith, the plates 28 thereby being adapted to retain the fluid in well 29 formed by the plates 28 and the converging surfaces of rolls 10 and 12 above the nip 18.

As best illustrated in FIGURE 1, rolls 10 and 12 are hollow cylindrical shells, and are internally heated by supplying steam to the enclosed chamber 30 of roll 10 and an analogous chamber (not shown) in roll 12 by means of suitable fittings 32 such as shown on roll 12. A packing gland or other type of seal is provided at the joint between the rolls and the steam pipes 32 to maintain the steam pressure inside the rolls.

The entire assembly is enclosed in a suitable vacuum chamber (not shown) in order to carry out the entire drying operation at an absolute pressure between about 20 mm. and 125 mm. Hg. The vacuum chamber is provided with suitable air locks (not shown) which are well known in the art in order that the dried, soluble tea solids may be periodically or continuously removed from the vacuum chamber without requiring the drying operation to be stopped.

According to the process of the present invention, as shown in FIGURE 2, a tea concentrate is supplied to the well 29 through distribution header 26 and the down-comers 24. As the drums 10 and 12 rotate in the direction indicated by arrows 14 and 16 respectively, a film 31 of tea concentrate is formed on each drum. Water is removed from the film 31 by the combined action of heat and vacuum to form a substantially dry film in the region 32 as the rotation of the drum carries the concentrate toward the doctor blades 20 and 22. When the dried film reaches the doctor blades it is scraped from the surface of the drum. Provided the drying variables are properly controlled as described below, the scraping action of the doctor blades breaks the dried film into a powder 34 having the desired density. The powder falls into the pans 36. By providing suitable airlocks (not shown) in the vacuum system the pans 36 can be periodically removed to recover the desired product without interrupting the operation of the drums.

An important process variable is the absolute pressure at which the drying is carried out. The process may be carried out at a pressure between 20 mm. and 125 mm. Hg, however, the preferred pressure range is about 35 mm. to 50 mm. Hg. Below 20 mm. the product becomes too fragile and has too low a bulk density. A fragile product tends to break up and become more dense during shipment. Thus, the appearance to the consumer is that the jar of instant tea appearing on the grocer's shelf has been incompletely filled. Furthermore, at extremely low bulk densities it is impossible to get the desired amount of tea in the standard size jars which are now commercially acceptable.

As the pressure of the drying operation rises above 125 mm., the dried tea solids tend to come off of the roller in the form of a sheet, rather than breaking up into the desired powdered material. Therefore, the product must be ground up before it can be used. Such high pressures, therefore, lead to undesirably high bulk densities.

There are two temperatures to consider, the temperature of the rolls 10 and 12 and the temperature of the tea concentrate in the well 29. The maximum drum temperature permissible is the fusion point of the tea solids. When the roll temperature is so high that the tea solids begin to fuse, their removal by the doctor blades becomes difficult and the bulk density of the resulting powder is adversely affected. High temperatures, furthermore, have a deleterious effect on the quality of the powdered tea product. While temperatures up to 280° F. have been used, it is preferred that the maximum temperature be limited to about 260° F. in order to obtain the highest quality product.

The minimum temperautre of rolls 10 and 12 is not important. However, at very low temperatures, i.e., below about 200° F., the drying is very slow thereby making the operation uneconomical. It is preferred that the temperature be maintained above about 240° F., because at lower temperatures, it becomes difficult to remove residual amounts of water.

The temperature in the drums is conveniently controlled by regulating the pressure of the steam when steam is used for heating the rolls. Thus, at 280° F., the steam pressure is about 35 pounds per square inch gauge (p.s.i.g.), at 260° F. the preferred maximum temperature, the steam pressure will be about 20 p.s.i.g., and at 240° F. the preferred minimum temperature, the steam pressure will be approximately 10 p.s.i.g. It is not necessary that the rolls be heated by steam. Electrical or other heating means, for example, could be used.

It will be realized that the foregoing temperatures are approximate. Because of the temperature drop through the surface of the drum required to transfer heat from the steam inside the drum to the external surface where the drying occurs, the temperature of the external surface may be several degrees lower than the steam temperature. This temperature differential may be affected by the material of construction. Thus, for instance, comparative experimental runs have shown that the drying rate on chrome-plated cast-iron rolls is somewhat higher than it is on stainless-steel rolls because the heat transfer properties of the chrome-plated cast-iron rolls are more favorable.

The second temperature variable is the temperature of the tea concentrate which is fed to the well 29. As the temperature is not important, a considerable temperature range is permissible. Typical temperatures may be between 70° and 140° F., however, the preferred temperature range is 90° to 120° F. The temperature of the tea concentrate in the well is controlled mainly by the absolute pressure in the system, i.e., the equilibrium temperature of boiling concentrate at the prevailing vacuum inside the apparatus. This equilibrium temperature is generally somewhat higher than the equilibrium temperature of pure water because of the dissolved solids present in the concentrate.

In the interest of high quality it is desirable to avoid prolonged contact of the tea concentrate in the well with the hot rotating surfaces of the drum. The amount of the tea concentrate in the well, therefore, is kept as low as possible. While the lower limit is not essential, it is preferred to maintain a sufficient level of concentrate in the well to obtain good distribution of the product over the entire surface of the rolls. It is evident that the process would be operable even in the absence of good distribution of the product over the entire surface of the rolls, however, this is commercially undesirable inasmuch as it would lead to low efficiency of operation.

Still another variable is the aperture of the nip. This aperture, broadly, may be between 0.002 inch and 0.015 inch; however, it is preferred that the drying be carried out using relatively narrower gaps, i.e., in the range of 0.002 to 0.004 inch. Excessively large apertures lead to films which do not dry properly.

The concentration of the tea solids in the concentrate may be varied. For obvious economic reasons, it is preferred that the tea be relatively concentrated, thereby reducing the amount of heat required to evaporate the water from a given amount of dried tea solids. The process may be successfully carried out with the tea concentrates containing from about 2% to about 70% solids by weight; however, the preferred range is between 30% and 55% by weight.

A considerable range in the dryness of the tea solids is permissible. In general the moisture content of the dried film is reduced to below about 7% by weight. It is usually preferred that the moisture content be about 3%. Dried powders may contain amounts as small as 0.3% moisture depending on the severity of the drying conditions.

The relationship between the drying variables and the moisture content of the dried powder is complex and cannot be quantitatively predicted. However, certain general guide lines are helpful. Thus, if the moisture content of the tea powder is too high, the vacuum may be increased, the temperature of the rolls may be increased or the speed of the rolls may be decreased. Such a change in each variable alone, or in combination with the other variables will tend to lower the moisture content. By a proper correlation of the drying variables, within the limits discussed above, a suitable dried tea powder may be obtained.

While one particular form of apparatus has been described for carrying out the present process, the invention is not limited thereto. Modifications, such as locating the doctor blades at varying positions with respect to the nip, will be readily apparent to those skilled in the art.

The present invention is further illustrated by reference to the following examples of its practice. In the examples a laboratory scale double drum rotary vacuum dryer was used. Concentrated tea extracts, unfilled and filled, were made prior to the test runs, and stored in a freezer at 0° F. The unfilled sample contained approximately 31.8% tea solids and the filled sample contained approximately 31.8% tea solids and 47.7% total solids. Samples were thawed as required for the experiments.

EXAMPLE I

An unfilled, undecreamed tea extract containing 31.8% solids was dried on a laboratory double drum dryer. Steam pressure in the drums was maintained between 18 and 20 p.s.i.g., corresponding to a temperature between 256° and 259° F. The extract fed to the well had a temperature of 100° F. and the vacuum at the rolls was maintained at 35 mm. Hg. The aperture at the nip was 0.002 inch. The level of the fluid in the well 29 above the nip was maintained at a moderate level sufficient to insure complete coverage of the rolls. The resulting dry tea solids had a bulk density of about 0.102 gram per cc.

EXAMPLE II

Figure 3:
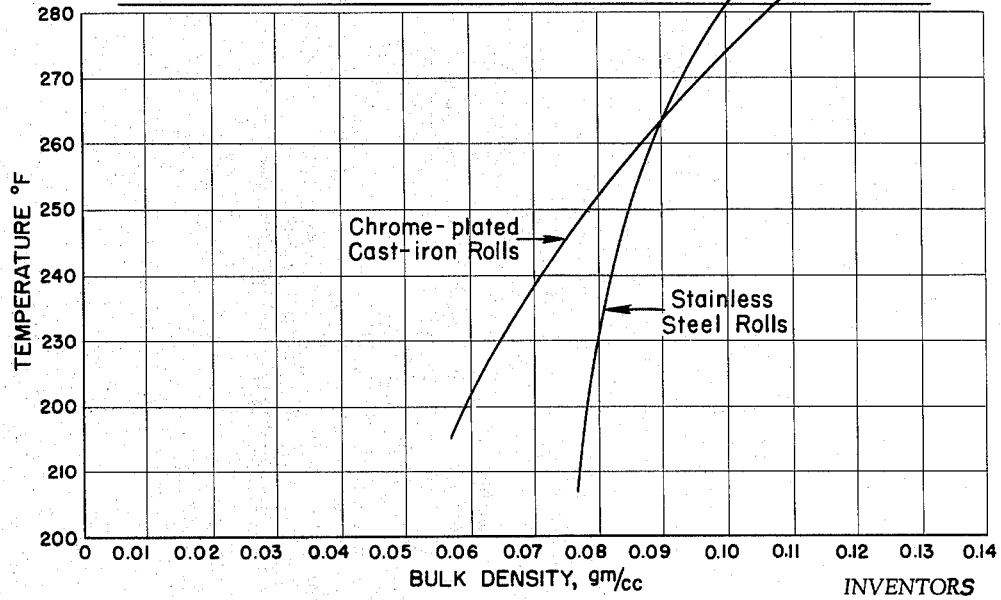
FIGURE 3 is a graph showing the effect of temperature on the product density.

To illustrate the effect of roll temperature on bulk density, the experiment described in Example I was repeated using a filled tea extract, i.e., containing 31.8% tea solids and 47.7% total solids. The roll speed was 4 r.p.m., the vacuum was maintained between 35 and 50 mm. Hg, the feed temperature was 100° F., and the nip aperture was 0.002 inch. Several measurements were made at each of several steam pressures between 2 and 35 p.s.i.g. Generally, increasing the steam pressure in the rolls tended to increase the bulk density. The results are set forth in FIGURE 3.

EXAMPLE III

Figure 4:
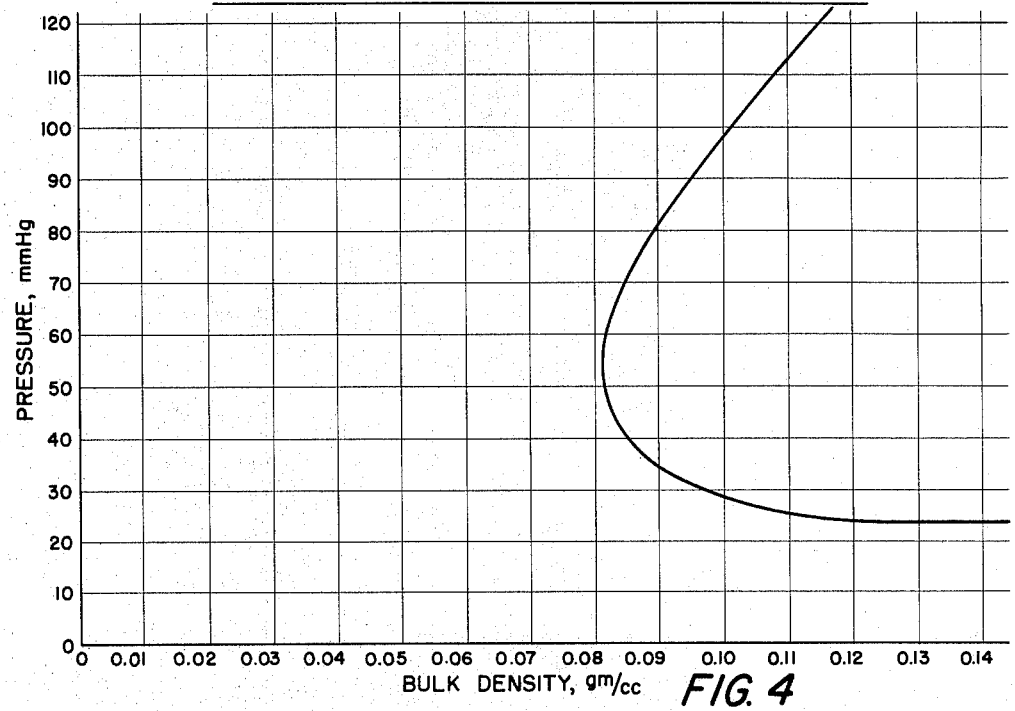
FIGURE 4 is a graph showing the effect of vacuum on the product density.

To determine the effect of vacuum on bulk density the procedure of Example I was again repeated. The roll speed was 4 r.p.m. and the steam pressure was between 18 and 20 p.s.i.g. Feed temperature was 100° F. and the nip aperture was 0.002 inch. As in the case of Example II a filled tea concentrate was used containing 31.8% tea solids and 47.7% total solids. The results are set forth in FIGURE 4.

At pressures from about 120 mm. Hg down to about 35 mm. Hg the bulk density shows a tendency to decrease as the pressure decreases. However, at the lowest pressures obtained, about 22 mm. Hg, an increase in bulk density was observed. This appeared to correspond to a change in the physical form of the tea powder. At the higher pressures, above about 35 mm. Hg, light flake-like, tea powder resulted, while at a pressure of 22 mm. Hg, a uniform crystalline tea powder was obtained.

EXAMPLE IV

To illustrate the effect of feed concentration on drying, a series of runs were made using a filled tea extract at various dilutions. The roll temperature was maintained between 256° and 259° F., and the vacuum pressure was about 35 mm. Hg. The nip spacing was 0.002 inch and the roll speed was 4 r.p.m. The extract fed to the well was at a temperature of about 100° F. The results are set forth in Table 1.

*Table 1*

*Effect of feed concentrate on drying*

| Feed | | Bulk density, gm./cc. |
|---|---|---|
| Percent Tea solids | Percent Total solids | |
| 2.21 | 4.33 | .1241 |
| 6.36 | 11.92 | .0818 |
| 33.80 | 50.00 | .0774 |
| 55.10 | 70.00 | .1082 |

EXAMPLE V

A quantity of a commercial undecreamed and unfilled tea concentrate containing 41.5% solids was centrifuged at 83° F. The decreamed extract obtained after centrifuging was filled by the addition of 1 part maltodextrin to 1 part of tea solids. The resulting concentrate, containing 49.5% total solids, was dried on a laboratory scale double-roll dryer at 50 mm. Hg and at a temperature of about 269° F. The nip spacing was 0.008 inch. For comparative purposes a sample of the undecreamed, unfilled tea concentrate was dried under identical conditions. The bulk density of the powder obtained from the undecreamed, unfilled sample was about 0.113 gm./cc., while the powder obtained from the decreamed and filled sample had a bulk density of about 0.147 gm./cc. The resulting powders were uniform, dry and produced a beverage having good flavor and color.

It will be understood that the foregoing examples are for illustrative purposes only, and that this invention includes all modifications and equivalents within the scope of the following claims.

We claim:

1. A method of drying a tea extract comprising supplying a tea extract containing from 2% to 70% tea solids by weight at a temperature between 70° F. and 140° F. to the well formed above the nip of a pair of horizontally adjacent rolls, the spacing between said rolls at the nip being between 0.002 inch and 0.015 inch, and, while maintaining an absolute pressure of between about 20 mm. and about 125 mm. Hg, rotating the surfaces of said rolls downwardly through said well to form a film of said extract on said surfaces, heating said rolls to a temperature between about 200° F. and about 280° F. to dry said film, said drying being continued until the moisture content of the film is below about 7%, and scraping the dried film from said rolls, thereby obtaining a dried, soluble powder having a bulk density between 0.06 and 0.17 gm./cc.

2. The method according to claim 1 wherein said tea extract contains between 30% and 55% tea solids by weight.

3. The method according to claim 1 wherein the temperature of said tea extract is between 90° and 120° F.

4. The method according to claim 1 wherein said tea extract is an undecreamed and unfilled concentrate.

5. The method according to claim 1 wherein the spacing between the rolls at said nip is between 0.002" and 0.004".

6. The method according to claim 1 wherein the absolute pressure is between 35 mm. and 50 mm. Hg.

7. The method according to claim 1 wherein the temperature of said rolls is between 240° and 260° F.

8. The method according to claim 1 wherein the said film is dried to a moisture content of about 3% by weight.

References Cited by the Examiner

UNITED STATES PATENTS 2,484,580  10/1949  Overton _____ 159—11 X
2,886,101  5/1959  Overton _____ 34—112

A. LOUIS MONACELL, *Primary Examiner.*